(12) United States Patent  (10) Patent No.: US 9,116,883 B2
Morita  (45) Date of Patent: Aug. 25, 2015

(54) COMMUNICATION TERMINAL INCLUDING CLUSTER INFORMATION CALCULATION SECTION AND DMA-TRANSFER SECTION

(75) Inventor: Junichi Morita, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/111,835

(22) PCT Filed: May 17, 2012

(86) PCT No.: PCT/JP2012/003251
§ 371 (c)(1),
(2), (4) Date: Oct. 15, 2013

(87) PCT Pub. No.: WO2012/160792
PCT Pub. Date: Nov. 29, 2012

(65) Prior Publication Data
US 2014/0068114 A1  Mar. 6, 2014

(30) Foreign Application Priority Data

May 23, 2011 (JP) ................................. 2011-114900

(51) Int. Cl.
*G06F 13/28* (2006.01)
(52) U.S. Cl.
CPC ...................... *G06F 13/28* (2013.01)
(58) Field of Classification Search
None
See application file for complete search history.

(56) References Cited

U.S. PATENT DOCUMENTS

| 5,884,313 | A | 3/1999 | Talluri et al. |
| 6,049,808 | A | 4/2000 | Talluri et al. |
| 6,341,318 | B1 * | 1/2002 | Dakhil ............................ 710/23 |
| 6,633,926 | B1 * | 10/2003 | Harada et al. ................... 710/22 |
| 2004/0167998 | A1 * | 8/2004 | Core ................................ 710/22 |
| 2008/0005389 | A1 * | 1/2008 | Ikeuchi ........................... 710/22 |

FOREIGN PATENT DOCUMENTS

| JP | 03-067352 A | 3/1991 |
| JP | 08-190524 A | 7/1996 |
| JP | 11-96127 A | 4/1999 |
| JP | 2004-206241 A | 7/2004 |
| JP | 2004-246828 A | 9/2004 |

OTHER PUBLICATIONS

International Search Report for PCT/JP2012/003251 dated Jul. 24, 2012.

* cited by examiner

Primary Examiner — Idriss N Alrobaye
Assistant Examiner — David Martinez
(74) Attorney, Agent, or Firm — Pearne & Gordon LLP

(57) ABSTRACT

A communication terminal includes a storage section that stores a file to be transmitted to an opponent terminal, a communication section that transmits the file to the opponent terminal, a cluster information calculation section that determines cluster information about clusters, and a DMA transfer section that DMA-transfers the file from the storage section to the communication section on the basis of the cluster information about the clusters to be transferred determined by the cluster information calculation section. The cluster information calculation section determines cluster information about clusters to be transferred next during the course of the DMA transfer.

7 Claims, 10 Drawing Sheets

COMMUNICATION TERMINAL INCLUDING CLUSTER INFORMATION CALCULATION SECTION AND DMA-TRANSFER SECTION

TECHNICAL FIELD

The invention relates to a communication terminal that transmits and receives a file.

BACKGROUND ART

With recent greater functionality of a mobile terminal and higher density of video contents, a mobile terminal commonly transmits and receives a high quality video the or a large-volume file. In such an environment, the communication terminal is requested to transmit and receive (perform communication of) a large-volume file at high speed to and from a communication terminal of an opponent.

A short range wireless communication using millimeter waves or infrared radiation has gained attention as high speed communication methods. In order to send and receive a file at high speed between communication terminals, it is important to perform data transmission processing or data receipt processing at high speed in each of the communication terminals to prevent occurrence of a decrease in effective speed of a wireless communication to the greatest extent possible.

In a transmission terminal, an application extracts a file from a storage, and the file is transmitted by designating an IP address of the communication terminal of the opponent as a communication device. In a receiving terminal, a communication device receives the file that the opponent's communication device transmitted to the IP address of the receiving terminal, and an application stores the file in the storage.

During transmitting and receiving of such communication terminals, each of CPUs (Central Processing Units) performs read and write processing between the application and the storage and between the application and the communication device, which incurs large amounts of overhead.

For instance a DMA (Direct Memory Access) controller described in connection with Patent Document 1 has hitherto been known as a method for reducing the overhead. FIG. 10 is a block diagram showing a system configuration of a related-art DMA controller. A brief overview of operation of the related-art DMA controller is described by reference to FIG. 10.

As shown in FIG. 10, the DMA controller described in connection with Patent Document 1 includes a CPU 1. ROM (Read Only Memory) 2, a memory controller 3, RAM (Random Access Memory) 4, a DMA controller 5 including a parameter setting FIFO 5a, and an I/O device 6.

The CPU 1 sets an address that shows a location on the RAM 4 where data are stored and a data size in the parameter setting FIFO 5a of the DMA controller 5. The DMA controller 5 DMA-transfers the data from the RAM 4 to the I/O device 6 in accordance with the address and the data size set in the parameter setting FIFO 5a.

Further, when a certain volume of file is DMA-transferred, the DMA controller 5 notifies the CPU 1 that the certain volume of file was DMA-transferred. The DMA controller thereby DMA-transfers the file between the RAM 4 and the I/O device 6. In this case, the DMA controller is capable of setting in the DMA controller 5 an address and a data size that are required to effect DMA transfer, so that the overhead which will arise during the DMA transfer can be reduced.

RELATED ART DOCUMENT

Patent Document

Patent Document 1: JP-A-2004-246828

SUMMARY OF THE INVENTION

Problem that the Invention is to Solve

However, when the DMA transfer described in connection with Patent Document 1 is applied to a communication between communication terminals, setting data required to perform DMA transfer (e.g., an address and a data size) must be prepared in connection with all sets of data to be transferred before initiation of the communication.

In particular, when a large-volume file is transmitted, a preparation for setting data in the DMA controller involves consumption of much time, and the preparation time leads to overhead. In addition, when the setting data necessary for DMA transfer are stored, the DMA controller requires a large volume of memory.

The invention aims at providing a communication terminal which can reduce communication overhead by minimizing, before initiating a communication, a time to prepare setting data necessary for a DMA controller.

According to one aspect of the invention, there is provided a communication terminal comprising:

a storage section configured to store a file to be transmitted to an opponent terminal;

a communication section configured to transmit the file to the opponent terminal;

a cluster information calculation section configured to determine cluster information about a cluster for each set of data to be transferred; and a DMA transfer section configured to DMA-transfer the file from the storage section to the communication section on the basis of the cluster information about the cluster to be transferred that the cluster information calculation section determined, wherein the cluster information calculation section is adapted to request cluster information about a next cluster to be transferred during the course of DMA transfer.

According to another aspect of the invention, there is provided a communication terminal comprising:

a communication section configured to receive a file transmitted from an opponent terminal;

a storage section configured to store the file received by the communication section;

an empty cluster information calculation section configured to calculate empty cluster information about empty clusters for each set of data to be transferred; and a DMA control section configured to set the empty cluster information about the file to be DMA-transferred, on the basis of the empty cluster information determined by the empty cluster information calculation section, wherein the empty cluster information calculation section is configured to determine empty cluster information about a next cluster to be transferred during course of DMA transfer.

According to still another aspect of the invention, there is provided a communication terminal comprising:

a storage section configured to store a file to be transmitted to an opponent terminal;

a communication section configured to transmit the file to the opponent terminal;

a DMA transfer section configured to DMA-transfer the file from the storage section to the communication section on the basis of cluster information about clusters which make up the file;

a file management section configured to manage the storage section by use of a predetermined file system;

a cluster search volume calculation section configured to calculate the volume of cluster search;

a cluster search section configured to search the storage section for the clusters in accordance with a calculation result of the cluster search volume calculation section; and a DMA control section configured to set in the DMA transfer section cluster information about the clusters that make up the file to be DMA-transferred, on the basis of in accordance with a calculation result of the cluster search section and the file system.

According to still another aspect of the invention, there is provided a communication terminal comprising:

a communication section configured to receive a file transmitted from an opponent terminal;

a storage section configured to store the file transmitted from the opponent terminal;

a DMA transfer section configured to DMA-transfer the file from the communication section to the storage section on the basis of empty cluster information about empty clusters equal in number to clusters which make up the file;

a file management section configured to manage the storage section by use of a predetermined file system;

a cluster search volume calculation section configured to calculate the volume of cluster search;

an empty cluster search section configured to search the storage section for the empty clusters equal in number to the clusters, in accordance with a calculation result of the cluster search volume calculation section; and a DMA control section configured to set empty cluster information about the file to be DMA-transferred, on the basis of a search result of the empty cluster search section and the file system.

Advantage of the Invention

The invention can reduce communication overhead by minimizing, before initiating a communication, a time to prepare setting data necessary for a DMA controller.

EMBODIMENT FOR IMPLEMENTING THE INVENTION

Figure 1:
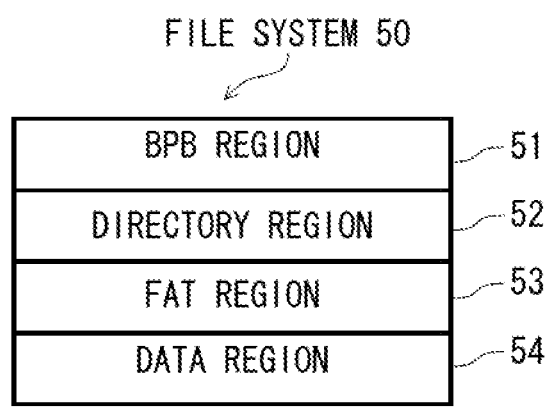
FIG. 1 is a structure chart of FAT 32.

An embodiment of the invention will be hereunder described by reference to the drawings.

With higher image quality/a greater volume of file to be handled by a mobile terminal, there are growing needs for high speed file swapping using short-range wireless communication. To this end, speeding up a series of operations, including reading a file from a storage by the transmission terminal or writing a file into the storage by the receiving terminal, as well as speeding up a communication in the wireless zone have been desired. In particular, the invention has been conceived to solve processing overhead which will be caused by software in the terminal.

The transmission terminal of the embodiment is arranged so as to perform, in parallel, processing for determining setting data necessary for a DMA controller on a per-transfer-data basis and DMA transfer of the transfer data from a storage section to a communication section.

Further, the receiving terminal performs, in parallel, processing for determining setting data necessary for the DMA controller on a per-transfer-data basis and processing for DMA-transferring the data from the communication section to the storage section, to thus store the data in the storage section.

<Explanations about Terms>

Terms used in the embodiment are now described.

In explanations about the transmission terminal, a total cluster size calculated by a cluster search volume calculation section of the transmission terminal before or concurrent with the DMA transfer is described as a "cluster search volume." For instance, a cluster search volume is 6 [KB].

In the explanations about the transmission terminal, information including a starting address representing a storage start location in a storage section of each of the clusters that make up the file and a size of each of the clusters specified for each file system (i.e., a unit cluster size) is described as "cluster information."

In the explanations about the receiving terminal, the total cluster size calculated by the cluster search volume calculation section of the receiving terminal before or concurrent with the DMA transfer is described as a "cluster search volume." Likewise, for instance, the cluster search volume is 6 [KB].

In explanations about the receiving terminal, information including a starting address which represents a location in the storage section where storing empty clusters equal in number to the clusters which make up the file is started and a size of each of the empty clusters specified for each file system (i.e., a unit empty cluster size) is described as "empty cluster information." In this respect, the unit cluster size and the unit empty cluster size are supposed to be identical with each other within a single terminal.

<Explanations about the File System>

A file that is transmitted and received between the transmission terminal and the receiving terminal and a file system of each of the terminals are now described by reference to FIG. 1 and FIG. 2.

FIG. 1 is a block diagram of FAT (File Allocation Tables) 32 when FAT 32 is used as the file system 50. FIG. 2 is an explanatory view for showing an example file storage of; for instance, a file (aaa.txt).

As shown in FIG. 1, the file system 50 includes a BPB (Bios Parameter Block) region 51, a directory region 52, an FAT region 53, and a data region 54.

Stored in the BPB region 51 are disk information including a file format type and positional information about the FAT region 53 and size (unit cluster size) information about each of the clusters which make up a file.

Stored in the directory region 52 is file information that includes a file name and a file size of each of files stored on a per-directory basis and starting cluster numbers of respective clusters that make up a file.

Figure 2:
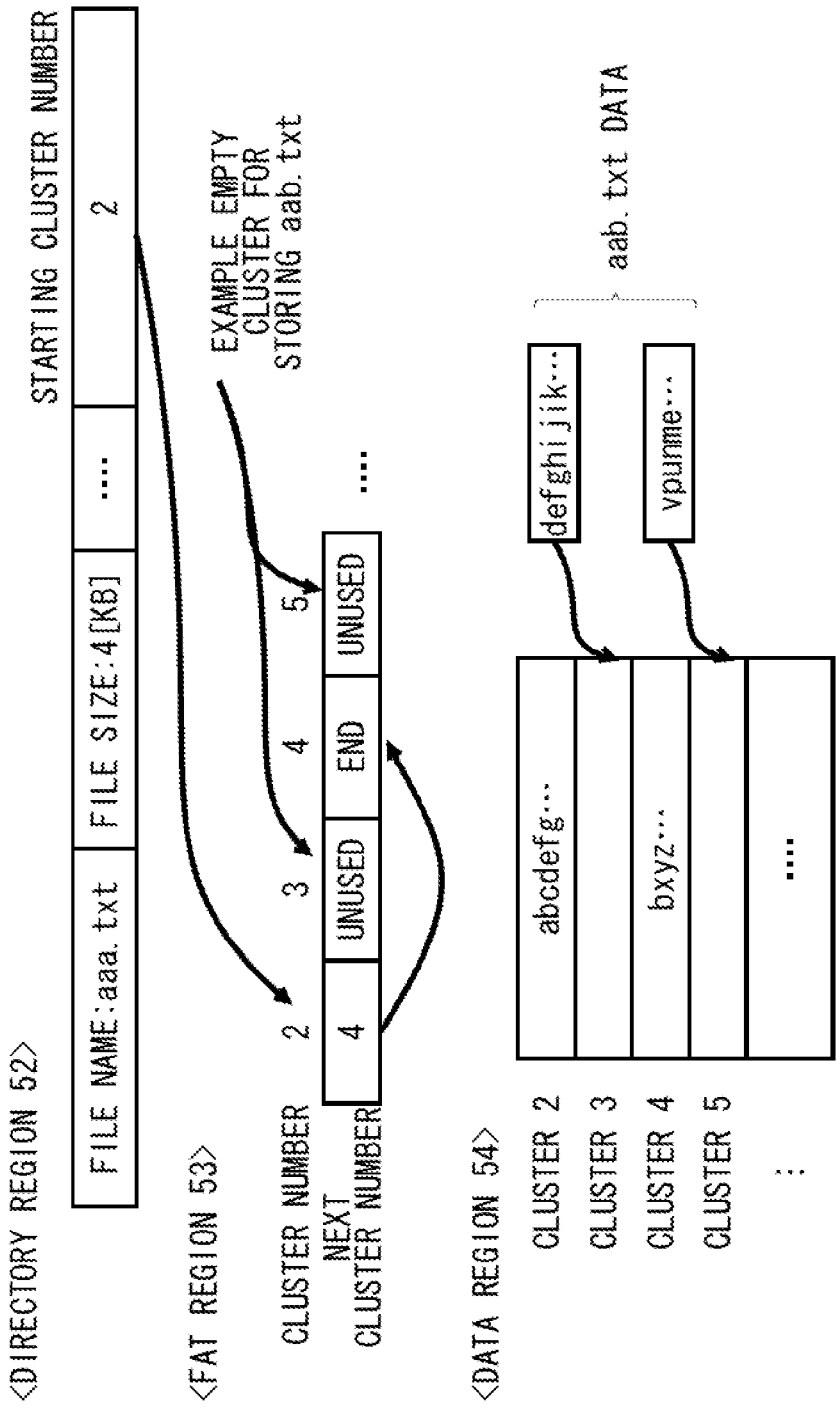
FIG. 2 is an explanatory view for illustrating example storage of a file (aaa.txt).

In connection with; for instance, the file (aaa.txt), at least a file name (aaa.txt), a file size (4 KB), and a starting cluster number are stored, as shown in FIG. 2, in the directory region 52. In the example shown in FIG. 2, a number of a starting cluster of the clusters that make up the file (aaa.txt) is two.

List information about the clusters that make up the file is stored in the FAT region 53. In relation to the list information about the clusters, for instance, use/nonuse of an individual cluster, the number of the next cluster in the clusters that make up the file, and information showing that the current cluster is a final one of the clusters that make up the file, are stored for each cluster number.

In relation to; for instance, information showing that the file (aaa.txt), the cluster number next to the starting cluster number 2 is four and that the cluster number 4 is a final cluster is stored in the FAT region 53.

Actual data of the file are stored in the data region 54. In relation to; for instance, the file (aaa.txt), data "abcdefg . . . " are stored in cluster 2, which is the starting cluster number, in the data region 54, and data "bxyz . . . " are stored in cluster 4 which is the final cluster number4.

<Explanations about a Configuration of the Communication Terminal>

Figure 3:
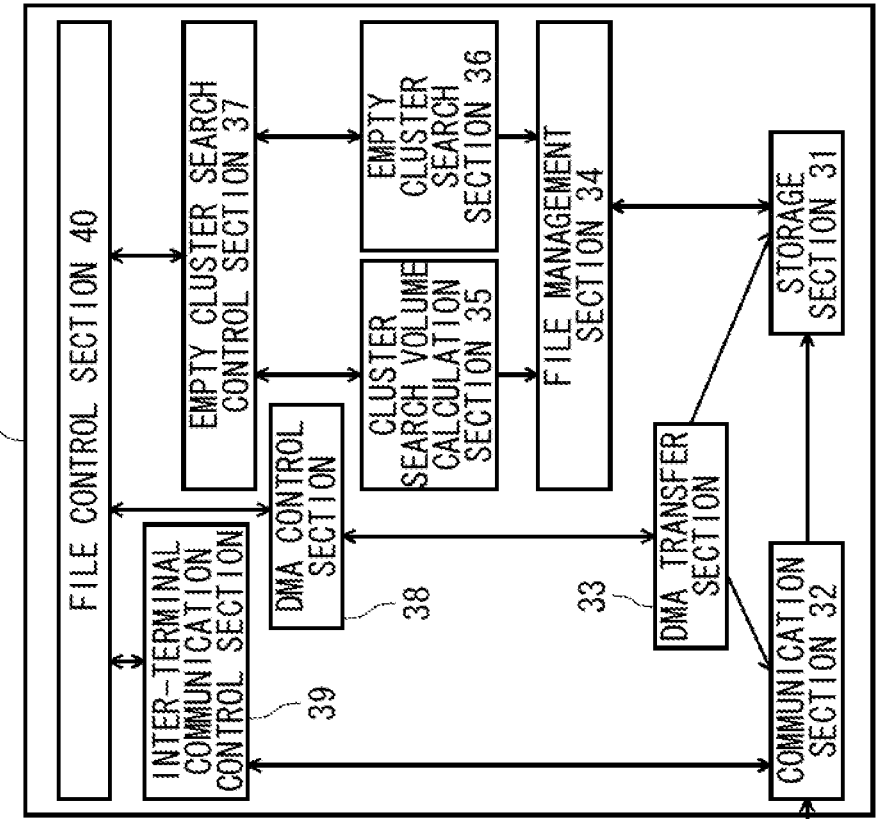
FIG. 3 is a block diagram showing an internal configuration of each of a transmission terminal and a receiving terminal.
Figure 3:
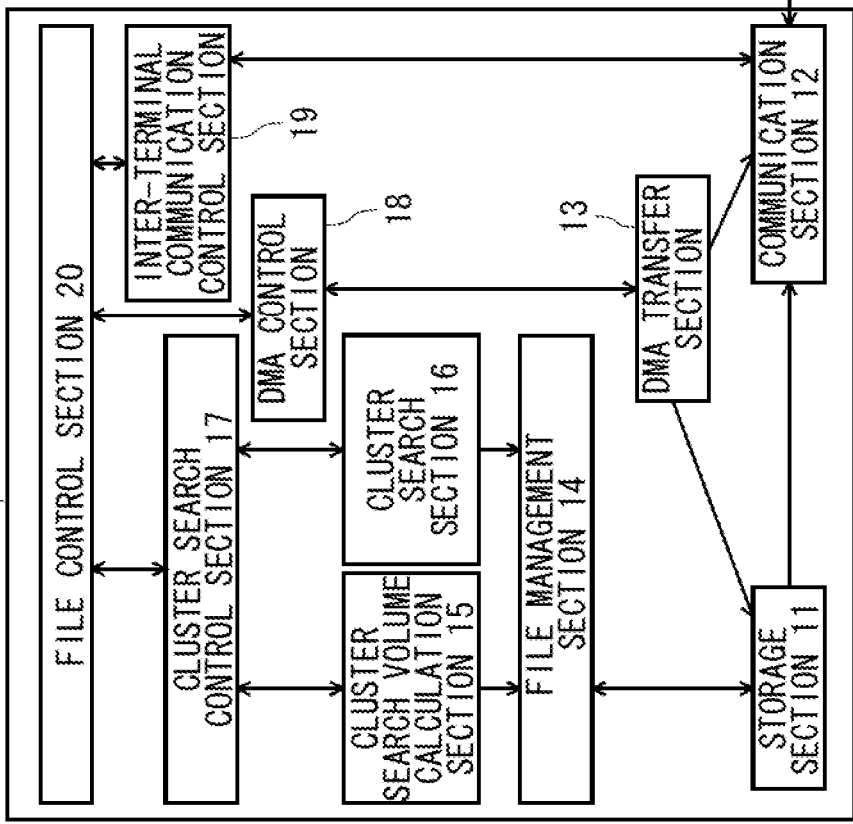

A configuration and operation of each of the transmission terminal and the receiving terminal that are communication terminals of the invention are now described. FIG. 3 is a block diagram showing an internal configuration of each of the transmission terminal 10 and the receiving terminal 30 that are communication terminals of the invention.

As shown in FIG. 3, the transmission terminal 10 includes a storage section 11, a communication section 12, a DMA transfer section 13, a file management section 14, a cluster search volume calculation section 15, a cluster search section 16, a cluster search control section 17, a DMA control section 18, an inter-terminal communication control section 19, and a file control section 20. In this regard, the file management section 14, the cluster search volume calculation section 15, the cluster search section 16, the cluster search control section 17, and the DMA control section 18 are collectively called hereunder a cluster information calculation section.

As shown in FIG. 3, the receiving terminal 30 includes a storage section 31, a communication section 32, a DMA transfer section 33, a file management section 34, a cluster search volume calculation section 35, an empty cluster search section 36, an empty cluster search control section 37, a DMA control section 38, an inter-terminal communication control section 39, and a file control section 40. The file management section 34, the cluster search volume calculation section 35, the empty cluster search section 36, the empty cluster search control section 37, and the DMA control section 38 are collectively called hereunder an empty cluster information calculation section.

Operation of the individual sections of the transmission terminal is now described.

The storage section 11 is made up of a hard disk drive or flash memory that is built in the transmission terminal 10 and stores a file which is transmitted to the receiving terminal 30 in response to user's operation.

The communication section 12 receives, as an input, data pertinent to the file DMA-transferred from the storage section 11 and transmits the thus-input data to the receiving terminal 30. The communication section 12 is capable of a wireless communication, which includes a millimeter communication, and an infrared communication with respect to the receiving terminal 30. Further, a wired communication; for instance, a LAN (Local Area Network), can also be used between the communication section 12 and the receiving terminal 30.

The DMA transfer section 13 acts as a DMA controller. The DMA transfer section 13 includes a storage region (e.g., memory) capable of storing a predetermined volume of information or data. The DMA transfer section 13 sets in the storage region cluster information output from the DMA control section 18 to be described later.

Figure 4:
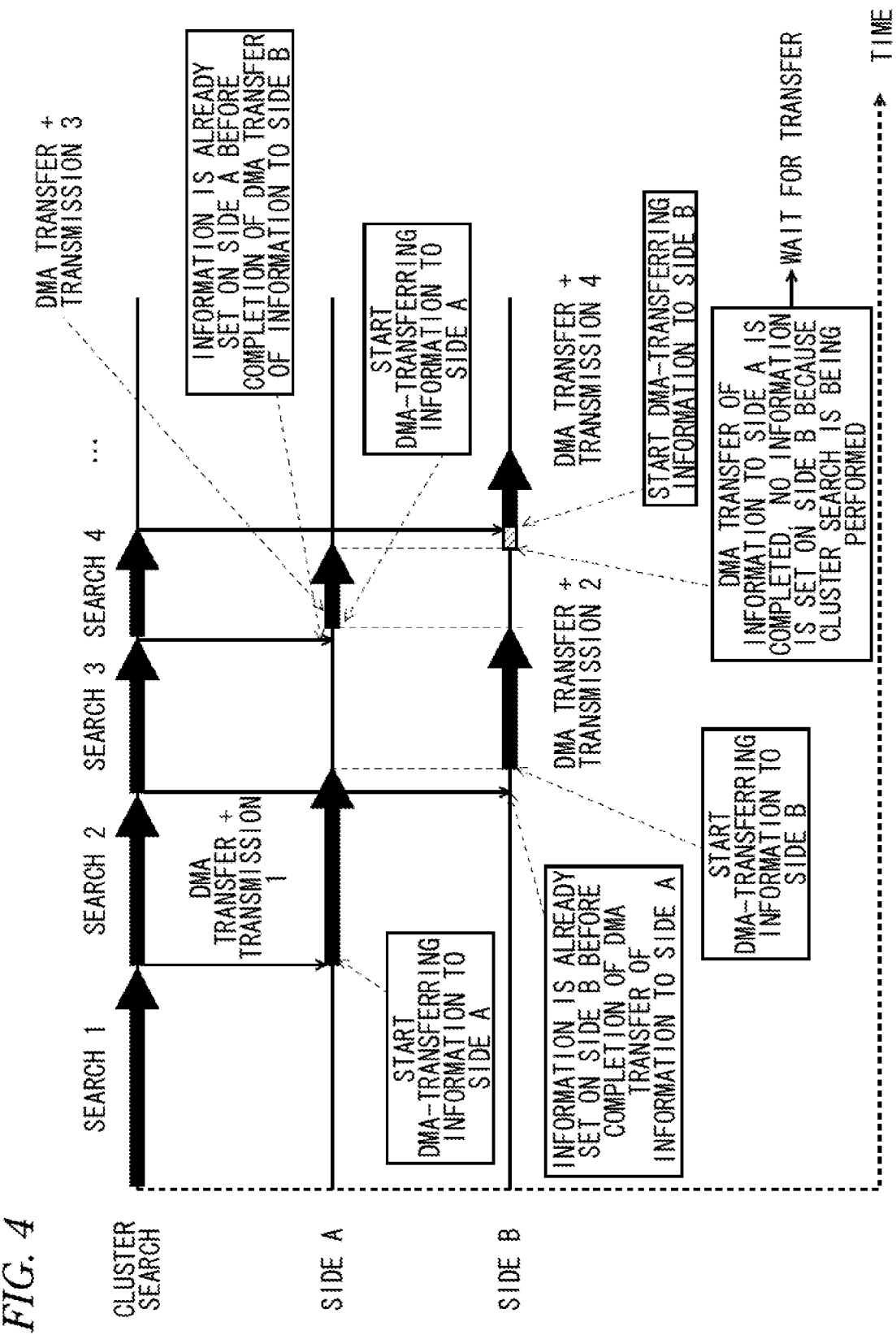
FIG. 4 is an explanatory view for explaining a time relationship among a cluster search, DMA transfer using cluster information, and a transmission of a file to the receiving terminal.

In the embodiment, the DMA transfer section 13 is presumed to have; for instance, at least two logic storage regions including side A and side B as cluster information storage regions (see FIG. 4).

In accordance with the cluster information set on the side A or side B of the internal storage region, the DMA transfer section 13 transfers, from the storage section 11 to the communication section 12, data pertaining to a file stored at the starting address of the cluster information by an amount corresponding to a preset cluster size.

The file management section 14 corresponds to one of OS (Operating System) functions of the transmission terminal 10 and manages data pertaining to files stored in the storage section 11 by use of the predetermined file system 50. The file system 50 corresponds to; for instance, FAT (File Allocation Tables) 16, FAT 32, and FAT 64. In the embodiment, explanations are provided by the exemplification of FAT 32 as shown in FIG. 1 and FIG. 2. In the embodiment, a file system other than FAT can also be handled likewise.

In response to a command from the cluster search control section 17, the cluster search volume calculation section 15 calculates a cluster search volume of cluster to be searched by the cluster search section 16, search before performing DMA transfer and transmitting a file to the receiving terminal 30 or concurrent with the DMA transfer. Specifically, the cluster search volume calculation section 15 calculates a cluster search volume, which is a total cluster size, from a file size of a file to be transmitted, a time to search for a unit-cluster-size cluster, and a time to transmit data pertinent to a unit-cluster-size file. Detailed operation of the cluster search volume calculation section 15 will be described later.

In response to user's operation, a file size of the file to be transmitted is input to the cluster search volume calculation section 15 by way of the file control section 20 and the cluster search control section 17.

The time to search for a unit-cluster-size cluster is previously specified by operation of the cluster search volume calculation section 15. Alternatively, when the time to search for a cluster of predetermined size is specified, the cluster search volume calculation section 15 may send to the file management section 14 an inquiry of a unit cluster size and calculate a time to search for a unit-cluster-size cluster.

A time to transmit a unit-cluster-size file between the transmission terminal 10 and the receiving terminal 30 is determined before initiation of a communication. The thus-determined time to transmit the unit-cluster-size file is input to the cluster search volume calculation section 15 by way of the inter-terminal communication control section 19, the file control section 20, and the cluster search control section 17.

The cluster search volume calculation section 15 outputs a cluster search volume, which is a calculated total cluster size, to the duster search control section 17.

In response to the command from the cluster search control section 17, the cluster search section 16 executes a duster search before performing DMA transfer and transmitting the file to the receiving terminal 30 or concurrent with the DMA transfer. The cluster search section 16 searches the file system of the file management section 14 for a cluster corresponding to the cluster search volume sent from the cluster search volume calculation section 15.

Specifically, the cluster search section 16 outputs to the cluster search control section 17, as a search result of the cluster search section 16, starting addresses of respective clusters that are equal in number to the cluster search volume and cluster information about sizes of the respective clusters (a unit cluster size).

An example of cluster search of the duster search section 16 is now described by reference to FIG. 2. In relation to a cluster search method, there is now described a method for searching for clusters of the file (aaa.txt) on the basis of a calculation result of the cluster search volume calculation section 15 by use of the file system 50 of the file management section 14.

The cluster search section 16 searches the directory region 52 of the file system 50 for the file (aaa.txt) that is a search target, thereby acquiring a starting cluster number (cluster number 2) of the file (aaa.txt). The cluster search section 16 acquires a unit cluster size of each of the clusters by reference to the BPB region 51 of the file system, determining from the unit cluster size the number of clusters that correspond to the calculation result (the cluster search volume) of the duster search volume calculation section 15.

On the basis of the thus-determined number of clusters, the cluster search section 16 outputs to the cluster search control section 17 as a cluster search result a set (including a starting address and a unit cluster size of cluster 2) and a set (including a starting address and a unit cluster size of cluster 4). The set (including the starting address and the unit cluster size of cluster 2) and the other set (including the starting address and the unit cluster size of cluster 4) each act as cluster information.

In this respect, the cluster search section 16 calculates starting addresses of the respective clusters in the data region 54 from the starting address (the starting address of cluster 0) and the unit cluster size of the known data region 54.

In relation to the file (aaa.txt) shown in FIG. 2, the clusters that make up the file are not consecutively present in the data region 54. In the data region 54, however, the clusters that make up the file are assumed to be consecutively present. For instance, cluster 2 and cluster 3 are assumed to be consecutively present. In this case, the cluster search section 16 outputs, as a cluster search result, cluster information [a starting address of a starting cluster (=cluster 2) and a unit cluster size×2] to the cluster search control section 17.

A time relationship between operation (DMA transfer) of the DMA transfer section 13 in the transmission terminal 10 and operation (cluster search) of the cluster search section 16 is now described by reference to FIG. 4. FIG. 4 is an explanatory view for explaining a time relationship between DMA transfer using cluster information and transmission of the file to the receiving terminal 30. A horizontal axis shown in FIG. 4 depicts time.

In the transmission terminal 10 of the embodiment, a cluster information storage region in the DMA transfer section 13 is finite. In the embodiment, the transmission terminal 10 performs in parallel DMA transfer using cluster information and setting the cluster search result (cluster information) in the DMA transfer section 13 for each set of data to be transferred (see FIG. 4).

In short, the transmission terminal 10 DMA-transfers the cluster information set in the DMA transfer section 13. While performing the DMA transfer, the transmission terminal 10 searches for clusters which are equal to a calculation result of the next cluster made by the cluster search volume calculation section 15, setting the cluster information of the cluster search section 16 in the DMA transfer section 13. In the embodiment, overhead in the communication between the transmission terminal 10 and the receiving terminal 30 can be diminished.

The transmission terminal performs, in parallel, the DMA transfer and the cluster search for each set of data to be transferred and, hence, performs a given volume of cluster search before performing the DMA transfer. A given volume of cluster search conducted by the cluster search section 16 during operation of the transmission terminal 10 before the first DMA transfer is hereunder described as a "first search volume."

The cluster search conducted before initiation of the DMA transfer consumes much time. A cluster search is assumed to perform at one time a search for all clusters belonging to an entire file size of a file to be transmitted (FIG. 4: Search 1 to Search 4, . . . ). Since DMA transfer is not initiated until the end of the cluster search, a time that elapses before the end of the search for all clusters results in occurrence of overhead in the communication between the terminals.

Consequently, before the DMA transfer section 13 performs DMA transfer, the cluster search volume calculation section 15 calculates a first search volume that makes up a given part of a file size of a file transmitted. The cluster search section 16 searches for a first search volume of cluster; i.e., a given volume of cluster corresponding to a calculation result of the cluster search volume calculation section 15 (i.e., Search 1: FIG. 4). In Search shown in FIG. 4, the overhead in the communication between the terminals can be diminished as the volume of cluster to be searched becomes smaller than the file size of the file to be transmitted.

In FIG. 4, when Search 1 of the cluster search section 16 is completed, the cluster search section 16 starts performing Search 2 according to the calculation result of the cluster search volume calculation section 15. The DMA control section 18 sets cluster information, which is a search result of Search 1, on the side A of the DMA transfer section 13. The transmission terminal 10 can thereby perform, in parallel, Search 2 of the cluster search section 16. DMA transfer operation of the DMA transfer section 13, and the transmission of the file to the receiving terminal 30 [see (DMA transfer+Transmission 1) shown in FIG. 4].

When Search 2 of the cluster search section 16 ends, the cluster search section 16 performs Search 3 according to the calculation result of the cluster search volume calculation section 15. The DMA control section 18 sets the cluster information, which is a search result of Search 2, to the side B of the DMA transfer section 13 before DMA transfer of the information to the side A is completed. The transmission terminal 10 can thereby perform, in parallel, Search 3 of the cluster search section 16, DMA transfer operation of the DMA transfer section 13, and the transmission of the file to the receiving terminal 30 [see (DMA transfer+Transmission 2) shown in FIG. 4]. In the respect, DMA transfer of the cluster information to the side B and the transmission of the file to the receiving terminal 30 are performed after completion of the DMA transfer of data to the side A and the transmission of the file to the receiving terminal 30.

When Search 3 of the cluster search section 16 ends, the cluster search section 16 performs Search 4 according to the calculation result of the cluster search volume calculation section 15. The DMA control section 18 sets the cluster information, which is a search result of Search 3, on the side B of the DMA transfer section 13 before DMA transfer of the information to the side A is completed. The transmission terminal 10 can thereby perform, in parallel, Search 4 of the cluster search section 16, DMA transfer operation of the DMA transfer section 13, and the transmission of the file to the receiving terminal 30 [see (DMA transfer+Transmission 3) shown in FIG. 4]. In the respect, DMA transfer of the information to the side A and the transmission of the file to the receiving terminal 30 are performed after completion of DMA transfer of data to the side B and the transmission of the file to the receiving terminal 30.

In FIG. 4, DMA transfer of the information to the side B and the transmission of the file to the receiving terminal 30 (DAM transfer+Transmission 4) are not initiated until cluster information, which is a search result of Search 4 of the cluster search section 16, is set on the side B of the DMA transfer section 13.

When the first search volume, which is a target of Search 1 of the cluster search section 16, is a given volume or less, Search 4 of the cluster search section 16 is not completed immediately after DMA transfer of the information to the side A and the transmission of the file to the receiving terminal 30 as illustrated in connection with the side B shown in FIG. 4 (a hatched area shown in FIG. 4). Specifically. DMA transfer of the information to the side B and the transmission of the file to the receiving terminal 30 are not performed in succession to the DMA transfer of the information to the side A and the transmission of the file to the receiving terminal 30, so that there occurs a wait of a given time for DMA transfer.

Figure 6:
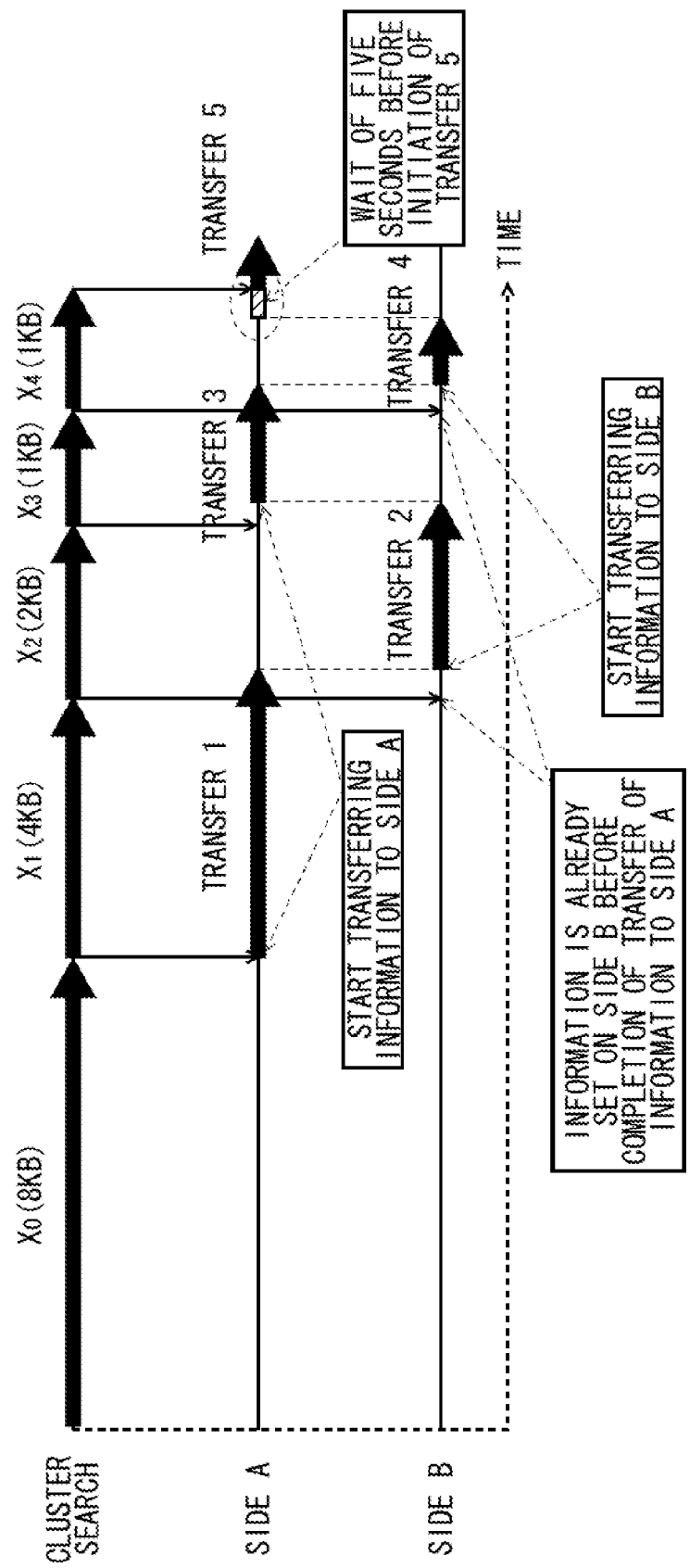
FIG. 6 is an explanatory view for specifically explaining a time relationship that arises, when a wait for DMA transfer occurs, between a cluster search and DMA transfer and transmission of the file to the receiving terminal which use cluster information.
Figure 7:
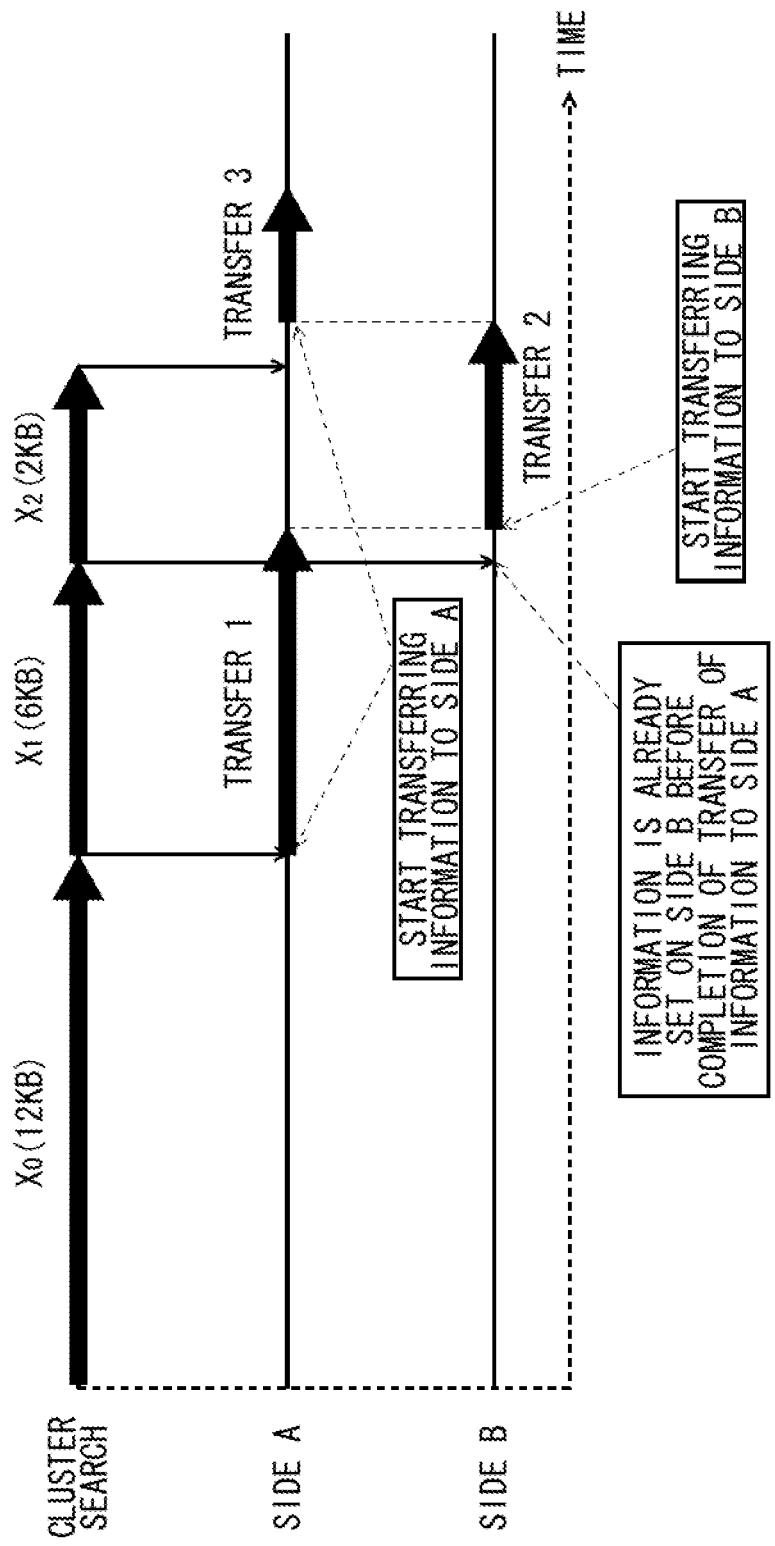
FIG. 7 is an explanatory view for specifically explaining a time relationship that arises, when the wait for DMA transfer does not occur, between the cluster search and the DMA transfer and transmission of the file to the receiving terminal which uses the cluster information.

Example calculation of the first search volume performed by the cluster search volume calculation section 15 is now described by reference to FIG. 6 and FIG. 7. FIG. 6 is an explanatory view for specifically explaining a time relationship that arises, when a wait for DMA transfer occurs, among a cluster search, the DMA transfer using cluster information, and transmission of the file to the receiving terminal. FIG. 7 is an explanatory view for specifically explaining a time relationship that arises, when the wait for DMA transfer does not occur, among the cluster search, DMA transfer using cluster information, and transmission of the file to the receiving terminal.

FIG. 6 and FIG. 7 provide explanations about examples of calculation of a first search volume, a second search volume, . . . that are performed by the cluster search volume calculation section 15 of the transmission terminal 10. The same can also likewise apply to calculation of a first search volume, a second search volume, . . . that are performed by the cluster search volume calculation section 35 of the receiving terminal 30. Therefore, explanations about the example of calculation of the first search volume performed by the cluster search volume calculation section 35 of the receiving terminal 30 are omitted.

In FIG. 6 and FIG. 7, "DMA transfer+Transmission 1" and "DMA transfer+Transmission 2" shown in FIG. 4 are described as "Transfer 1" and "Transfer 2" for the sake of convenience. In this respect, Transfer 1 is tantamount to a time that is the sum of a time consumed by DMA transfer of data from a storage (e.g., the storage section 11) to a communication device (e.g., the communication section 12) and a time consumed by a transmission of a file from the communication device. Alternatively, Transfer 1 can also be tantamount to a time that is the sum of a time consumed when the communication device receives the data and a time consumed by DMA transfer of the file from the communication device to the storage.

Incidentally, a file size of a file transmitted from the receiving terminal 30 is taken as a parameter Z; a cluster search time consumed by a search for a unit-cluster-size cluster is taken as a parameter Ts; and a data transmission time to transmit a unit-cluster-size file is taken as a parameter Tt. The cluster search volume calculation section 15 calculates a first search volume $X_0$ that fulfills Mathematical Expression (1). Further, the cluster search volume calculation section 15 calculates the $n^{th}$ search volume $X_n$ that fulfills Mathematical Expression (2) and that is subsequent to the first search volume, by use of an $(n-1)^{th}$ search volume $X_{n-1}$.

[Mathematical Expression 1]

$$X_0 \geq \frac{Z(Ts - Tt)}{Ts} \quad (1)$$

[Mathematical Expression 2]

$$X_n = \frac{Tt}{Ts} \times X_{n-1} \quad (2)$$

In FIG. 6, suppose the parameter Z=20 [KB], the parameter Ts=10 [s (second)/KB], the parameter Ts=5 [s (second)/KB], and the unit cluster size=1 [KB]. The cluster search volume calculation section 15 sets; for instance, the first search volume $X_0$=8 [KB] as the first search volume $X_0$ that does not fulfill Mathematical Expression (1).

In FIG. 6, cluster information about 8 KB clusters [eight clusters] searched in accordance with the first search volume $X_0$ (=8 KB) is first set on the side A of the DMA transfer section 13. A time to transmit the 8 KB data is defined as 8 [KB]×5 [s (second)/KB]=40 [s (second)]. The 8 KB data are kept being DMA-transferred and transmitted to the receiving terminal 30 for 40 seconds (see Transfer 1 shown in FIG. 6). The cluster search volume calculation section 15 calculates the next, cluster search volume (a second cluster volume $X_1$) as 40/10=4 [KB] concurrent with the DMA transfer and transmission of the file to the receiving terminal 30.

Cluster information about 4 KB clusters (four clusters) searched in accordance with the second search quantity $X_1$ (=4 KB) is set on the side B of the DMA transfer section 13. The time to transmit the 4 KB data is defined as 4 [KB]×5 [s (second)/KB]=20 [s (second)]. 4 KB data are kept being DMA-transferred and transmitted to the receiving terminal 30 over 20 seconds (see Transfer 2 shown in FIG. 6). Concurrent with the DMA transfer and transmission of the file to the receiving terminal 30, the cluster search volume calculation section 15 calculates the next cluster search volume (a third search volume $X_2$) as 20/10=2 [KB].

Cluster information about 2 KB clusters searched in accordance with the third search volume $X_2$ (=2 KB) is set on the side A of the DMA transfer section 13. A time consumed by transmission of the 2 KB data is defined as 2 [KB]×[s (second)]=10 [s (second)], and 2 KB data are kept being DMA-transferred and transmitted to the receiving terminal 30 over 10 s (seconds) (see Transfer 3 shown in FIG. 6). Concurrent with the DMA transfer and transmission of the file to the receiving terminal 30, the cluster search volume calculation section 15 calculates the next cluster search volume (a fourth search volume $X_3$) as 10/10=1 [KB].

Cluster information about 1 KB clusters searched in accordance with the fourth search volume $X_3$ (=1 KB) is set on the side A of the DMA transfer section 13. A time consumed by transmission of the 1 KB data is defined as 1 [KB]×5 [s (second)1 KB]=5[s (second)], and the 1 KB data are kept being DMA-transferred and transmitted to the receiving terminal 30 over 5 s (seconds) (see Transfer 4 shown in FIG. 6). Concurrent with DMA transfer and transmission of the file to the receiving terminal 30, the cluster search volume calculation section 15 calculates the next cluster search volume (a fourth search volume $X_4$) as 5/10=0.5 [KB].

Since the unit cluster size is 1 KB; namely, since the minimum cluster search unit is 1 KB, the cluster search volume calculation section 15 calculates a fifth search volume $X_4$ as 1 [KB] in the same way as in the case of the fourth search volume $X_3$. During Transfer 4 and Transfer 5 shown in FIG. 6, a wait of five seconds for DMA transfer occurs until the end of a search for a cluster having the fifth search volume $X_4$. Subsequently, a wait of five seconds for DMA transfer occurs every cluster search until the end of a search for all clusters having a file size of 20 KB, so that overhead in the communication between the terminals becomes augmented.

In FIG. 7, suppose the parameter Z=20 [KB], the parameter Ts=10 [s (second)/KB], the parameter Ts=5 [s (second)/KB], and the unit cluster size=1 [KB]. The cluster search volume calculation section 15 sets; for instance, the first search volume $X_0$=12 [KB] as the first search volume $X_0$ that fulfills Mathematical Expression (1).

In FIG. 7, cluster information about 12 KB clusters [12 clusters] searched in accordance with the first search volume $X_0$ (=12 KB) is first set on the side A of the DMA transfer section 13. A time to transmit the 12 KB data is defined as 12 [KB]×5 [s (second)/KB]=60 [s (second)]. The 12 KB data are kept being DMA-transferred and transmitted to the receiving terminal 30 for 60 seconds (see Transfer 1 shown in FIG. 7). The cluster search volume calculation section 15 calculates the next, cluster search volume (a second cluster volume $X_1$) as 60/10=6 [KB] concurrently with the DMA transfer and transmission of the file to the receiving terminal 30.

Cluster information about 6 KB clusters (six clusters) searched in accordance with the second search quantity $X_1$ (=6 KB) is set on the side B of the DMA transfer section 13. A time to transmit the 6 KB data is defined as 6 [KB]×5 [s (second)/KB]=30 [s (second)]. 6 KB data are kept being DMA-transferred and transmitted to the receiving terminal 30 over 30 seconds (see Transfer 2 shown in FIG. 7). Concurrent with DMA transfer and transmission of the file to the receiving terminal 30, the cluster search volume calculation section 15 calculates the next cluster search volume (a third search volume $X_2$) as 30/10=3 [KB].

A file size of a file to be transmitted to the receiving terminal 30 is 20 KB. Therefore, since the cluster search section 16 has already searched for 18 KB clusters (=12 KB+6 KB), the cluster search section 16 searches for 2 KB clusters of the calculation result (the third search volume $X_2$=3 KB) made by the cluster search volume calculation section 15.

Cluster information about 2 KB clusters (two clusters) of the third search volume $X_2$ (=3 KB) is set on the side A of the DMA transfer section 13. A time to transmit the 2 KB data is defined as 2 [KB]×5 [s (second)/KB]=10 [s (second)]. 2 KB data are kept being DMA-transferred and transmitted to the receiving terminal 30 over 10 seconds (see Transfer 3 shown in FIG. 7). In contradistinction to the example shown in FIG. 6, overhead does not occur in the communication between the terminals in connection with the example calculation of the search volume shown in FIG. 7.

In response to a command from the file control section 20, the cluster search control section 17 controls operation of the cluster search volume calculation section 15 and operation of the cluster search section 16. The cluster search control section 17 outputs; for instance, a search result (cluster information) of the cluster search section 16 to the file control section 20.

In response to a command from the file control section 20, the DMA control section 18 controls operation of the DMA transfer section 13. The DMA control section 18 sets the search result (the cluster information) of the cluster search section 16 in a storage region of the DMA transfer section 13 by way of; for instance, the cluster search control section 17 and the file control section 20.

In response to a command from the file control section 20, the inter-terminal communication control section 19 controls operation of the communication section 12. The inter-terminal communication control section 19 outputs to the communication section 12 a command to transmit to the receiving terminal 30; for instance, file information including a file name and a file size of the file to be transmitted to the receiving terminal 30.

The file control section 20 controls operation of the respective sections of the transmission terminal 10, thereby controlling operation of the respective sections in conformity with user's operation. Arrows between the file control section 20 and the file management section 14 are omitted from FIG. 1.

<Explanations about Operation of the Respective Sections of the Receiving Terminal 30>

Operation of the respective sections of the receiving terminal 30 is now described.

The storage section 31 is made up of a hard disk drive or flash memory to be built in the receiving terminal 30. The storage section 31 stores files transmitted from the transmission terminal 10 in response to the user's operation.

The communication section 32 receives data pertinent to a file transmitted from the transmission terminal 10 by use of a short-range wireless communication, DMA-transferring the thus-received data to the storage section 31 at a command from the DMA transfer section 33. The communication section 32 can perform a wireless communication, including a millimeter wave communication, and an infrared-ray communication with respect to the transmission terminal 10. In addition, the communication section 32 can also employ a wired communication; for instance, a LAN, with respect to the transmission terminal 10.

The DMA transfer section 33 acts as a DMA controller. The DMA transfer section 33 is configured by including a storage region capable of storing a predetermined volume of information or data (e.g., memory). The DMA transfer section 33 sets in the storage region cluster information that is output from the DMA control section 38 to be described later.

Figure 5:
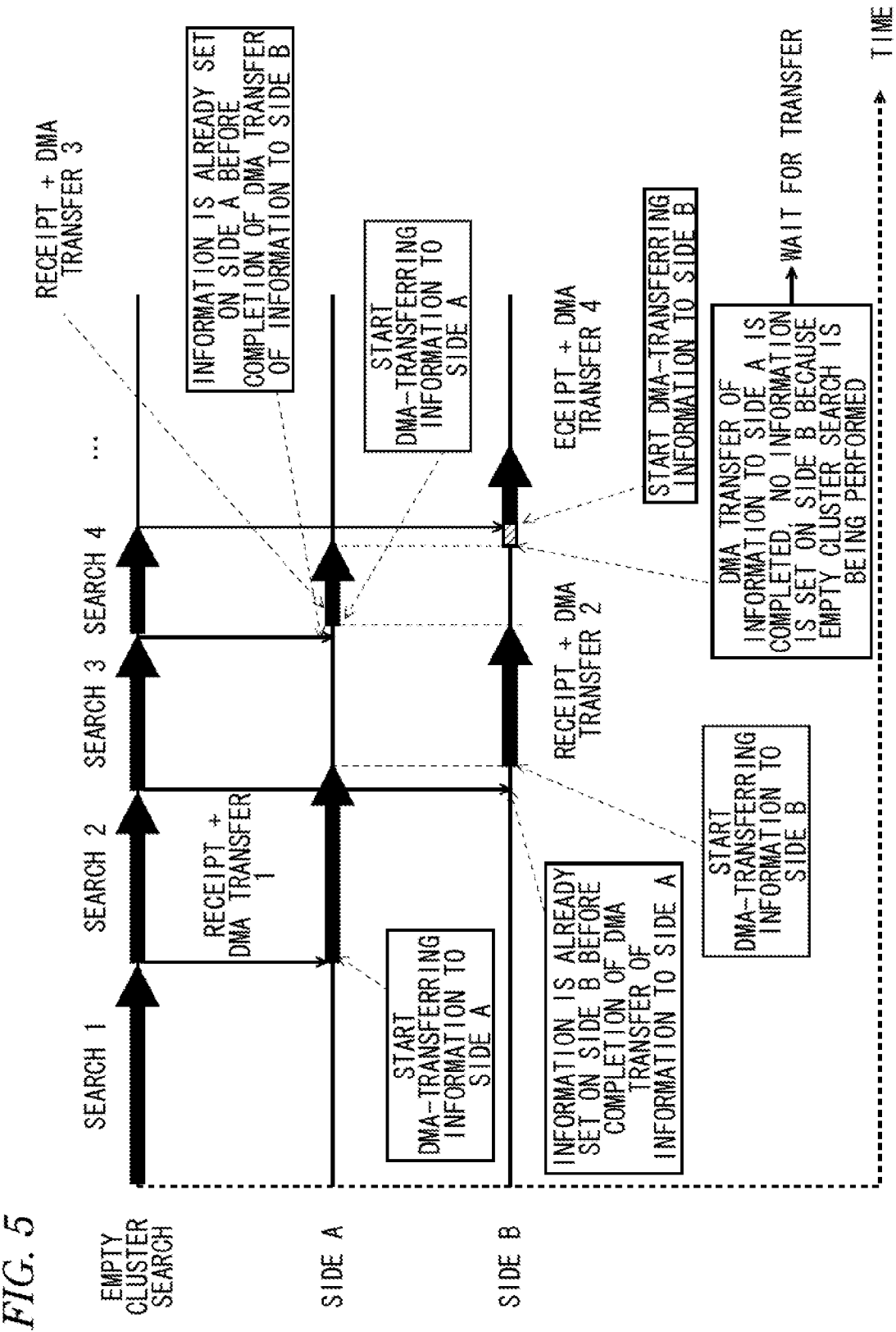
FIG. 5 is an explanatory view for explaining a time relationship among an empty cluster search, the DMA transfer using empty cluster information, and receipt of the file from the transmission terminal.

The DMA transfer section 33 has as a cluster information storage region; for instance, two logical storage regions including the side A and the side B (see FIG. 5).

In accordance with the cluster information set on the side A or the side B of the storage region in the DMA transfer section 33, the DMA transfer section 33 performs a DMA transfer from the communication section 32 to the storage section 31. Specifically, in accordance with the cluster information, the DMA transfer section 33 DMA-transfers from the communication section 32 to the storage section 31 data pertinent to files in the starting address of the cluster information by an amount corresponding to a unit cluster size of the cluster information.

The file management section 34 is one of the OS (Operating System) functions of the receiving terminal 30 and manages data pertinent to files stored in the storage section 31 by use of a predetermined file system 50. The file system 50 corresponds to; for instance, FAT (File Allocation Tables) 16, FAT 32, and FAT 64. In the embodiment, as shown in FIG. 1 and FIG. 2, explanations are provided by exemplification of FAT 32. The file system 50 can handle files likewise even when there is employed a file system other than the FAT.

In response to a command from the empty cluster search control section 37, the cluster search volume calculation section 35 calculates a cluster search volume for clusters that are equal in number to empty clusters searched by the empty cluster search section 36, before performing DMA transfer and transmitting the file to the receiving terminal 30 or concurrent with DMA transfer. Specifically, the cluster search volume calculation section 35 calculates a cluster search volume from a file size of a file received, a time to search for an empty unit-cluster-size cluster, and a time to receive data pertinent to a unit-cluster-size file. Detailed operation of the cluster search volume calculation section 35 will be described later.

In response to user's operation, a file size of the file to be transmitted is input to the cluster search volume calculation section 35 by way of the file control section 40 and the cluster search control section 37.

A time to search for an unit-cluster-size empty cluster is previously specified by operation of the cluster search volume calculation section 35. Alternatively, when the time to search for a cluster of predetermined size is specified, the cluster search volume calculation section 35 may send to the file management section 34 an inquiry of a unit cluster size and calculate a time to search for a unit-cluster-size empty cluster.

A file transmission time to receive a unit-cluster-size file between the transmission terminal 10 and the receiving terminal 30 is determined before initiation of the communication. The thus-determined time to receive the unit-cluster-size file is assumed to be input to the cluster search volume calculation section 35 by way of the inter-terminal communication control section 39, the file control section 40, and the cluster search control section 37.

The cluster search volume calculation section 35 outputs a calculation result of the cluster search volume calculation section 35 to the cluster search control section 37.

In response to the command from the cluster search control section 37, the empty cluster search section 36 executes an empty cluster search before receiving a file and performing DMA transfer or concurrent with the DMA transfer. To be specific, the empty cluster search section 36 searches, at commanded timing, the file system of the file management section 34 for empty clusters that are equal in number to the calculation result of the cluster search volume calculation section 35 (the cluster search volume).

Specifically, the empty cluster search section 36 outputs as a search result of the empty cluster search section 36 to the cluster search control section 37 empty cluster information about empty clusters that are equal in number to clusters conforming to the cluster search volume.

An example of empty cluster search of the empty cluster search section 36 is now described by reference to FIG. 2. Specifically, the empty cluster search is now described by reference to a method for searching for empty clusters to store a file (aab.txt) on the basis of the calculation result of the cluster search volume calculation section 35 by use of the file system 50 of the file management section 34.

The empty cluster search section 36 acquires a unit cluster size by reference to a BPB region 51 of the file system 50. The empty cluster search section 36 determines from the unit cluster size the number of clusters corresponding to the calculation result (the cluster search volume) of the cluster search volume calculation section 35.

By reference to a FAT region 53 of the file system 50, the empty cluster search section 36 acquires empty cluster numbers for empty clusters that are equal in number to the thus-determined number of clusters. In the example shown in FIG. 2, cluster number 3 and cluster number 5 become empty cluster numbers, respectively.

On the basis of the thus-determined number of clusters, the empty cluster search section 36 outputs empty cluster information as an empty cluster search result to the cluster search control section 37. In this respect, the empty cluster information is; for instance, a set (including a starting address and a unit empty cluster size of cluster 3) and another set (including a starting address and a unit empty cluster size of cluster 5).

The cluster search section 36 calculates a starting address of each of the clusters in the data region 54 from a starting address (a starting address of cluster 0) and a unit empty cluster size of the known data region 54.

In FIG. 2, clusters that make up the file are not consecutively stored in the data region 54. Empty clusters that are equal in number to clusters that make up the file are assumed to be consecutively present in the data region 54, as in the case of; for instance, cluster 4 and cluster 5. In this case, the empty cluster search section 36 outputs, as a cluster search result, empty cluster information [a starting address of a starting cluster (=cluster 4) and a unit cluster size×2) to the cluster search control section 37.

A time relationship between operation (DMA transfer) of the DMA transfer section 33 in the receiving terminal 30 and operation (empty cluster search) of the empty cluster search section 36 is now described by reference to FIG. 5. FIG. 5 is an explanatory view for explaining a time relationship among an empty cluster search, the DMA transfer using the empty cluster information, and receipt of a file from the transmission terminal. A horizontal axis shown in FIG. 5 depicts time.

In the receiving terminal 30 of the embodiment, an empty cluster information storage region in the DMA transfer section 33 is finite. In the embodiment, the receiving terminal 30 performs in parallel DMA transfer using empty cluster information and setting an empty cluster search result (empty cluster information) in the DMA transfer section 33 (see FIG. 5).

In short, the receiving terminal 30 performs DMA transfer by use of the empty cluster information set in the DMA transfer section 33. While performing the DMA transfer, the receiving terminal 30 searches for empty clusters that are equal in number to the clusters corresponding to the calculation result of the cluster search volume calculation section 35, setting the search result (empty cluster information) of the cluster search section 36 in the DMA transfer section 33. In the embodiment, the transmission terminal 10 and the receiving terminal 30 can thereby diminish overhead occurred in the communication between the transmission terminal 10 and the receiving terminal 30.

Since the receiving terminal 30 performs, in parallel, the DMA transfer and the cluster search on a per-cluster basis, the receiving terminal 30 performs a given volume of empty cluster search before conducting DMA transfer. A given volume of cluster search conducted during operation of the receiving terminal 30 by the cluster search section 36 before the first DMA transfer is hereunder described as a "first search volume."

The empty cluster search conducted before initiation of the DMA transfer consumes much time. An empty cluster search is assumed to be tantamount to performing at one time a search for all empty clusters which are equal in number to an entire file size of a file to be received (FIG. 5: Search 1 to Search 4, . . . . ) Since the DMA transfer is not performed until the end of the empty cluster search, a time that elapses before the end of the search for all empty clusters results in occurrence of overhead in the communication between the terminals.

Consequently, the cluster search volume calculation section 35 calculates a first search volume that makes up a given part of a file size of a file received before the DMA transfer section 33 performs DMA transfer. The empty cluster search section 36 searches for empty clusters of a first search volume that is a given volume of cluster corresponding to the calculation result of the cluster search volume calculation section 35 (i.e., Search 1: FIG. 5). In Search 1 shown in FIG. 5, overhead in the communication between the terminals can be diminished as the volume of empty cluster searched becomes smaller than the file size of the file to be transmitted.

In FIG. 5, when Search 1 of the empty cluster search section 36 is completed, the empty cluster search section 36 performs Search 2 according to the calculation result of the cluster search volume calculation section 35. The DMA control section 38 sets empty cluster information, which is a search result of Search 1, on the side A of the DMA transfer section 33. The receiving terminal 30 can thereby perform, in parallel, Search 2 of the empty cluster search section 36, receipt of the file from the transmission terminal 10, and DMA transfer operation of the DMA transfer section 33 [see (Receipt+DMA transfer 1) shown in FIG. 5].

When Search 2 of the empty cluster search section 36 ends, the empty cluster search section 36 performs Search 3 according to the calculation result of the cluster search volume calculation section 35. The DMA control section 38 sets the empty cluster information, which is a search result of Search 2, on the side B of the DMA transfer section 33 before completion of DMA transfer of the data to the side A is completed. The receiving terminal 30 can thereby perform, in parallel, Search 3 of the empty cluster search section 36, receipt of the file from the transmission terminal 10, and DMA transfer operation of the DMA transfer section 33 [see (Receipt+DMA transfer 2) shown in FIG. 5]. In the respect, the receipt of the file from the transmission terminal 10 and the DMA transfer of the information to the side B are performed after completion of receipt of the file from the transmission terminal 10 and the DMA transfer of the information to the side A.

When Search 3 of the empty cluster search section 36 ends, the empty cluster search section 36 performs Search 4 according to the calculation result of the cluster search volume calculation section 35. The DMA control section 38 sets empty cluster information, which is a search result of Search 3, on the side A of the DMA transfer section 33 before DMA transfer of the information to the side B is completed. The receiving terminal 30 can thereby perform, in parallel, Search 4 of the empty cluster search section 36, receipt of the file from the transmission terminal 10, and DMA transfer operation of the DMA transfer section 33 [see (Receipt+DMA transfer) shown in FIG. 5]. In the respect, receipt of the file from the transmission terminal 10 and DMA transfer of the information to the side A are performed after completion of receipt of the file from the transmission terminal 10 and DMA transfer of the information to the side B.

In FIG. 5, receipt of the file from the transmission terminal 10 and DMA transfer of the information to the side B (DAM transfer+Transmission 4) are not initiated until cluster information, which is a search result of Search 4 of the empty cluster search section 36, is set on the side B of the DMA transfer section 33.

When the first search volume, which is a target of Search 1 of the empty cluster search section 36, is a given volume or less, Search 4 of the empty cluster search section 36 is not completed immediately after receipt of the file from the transmission terminal 10 and DMA transfer of the information to the side A (a hatched area on the side B shown in FIG. 5). Specifically, receipt of the file from the transmission terminal 10 and DMA transfer of the information to the side A are not performed in succession to receipt of the file from the transmission terminal 10 and the DMA transfer of the information to the side B, so that there occurs a wait of a given time for DMA transfer.

<Explanations about the Operation of the Transmission Terminal 10>

Figure 8:
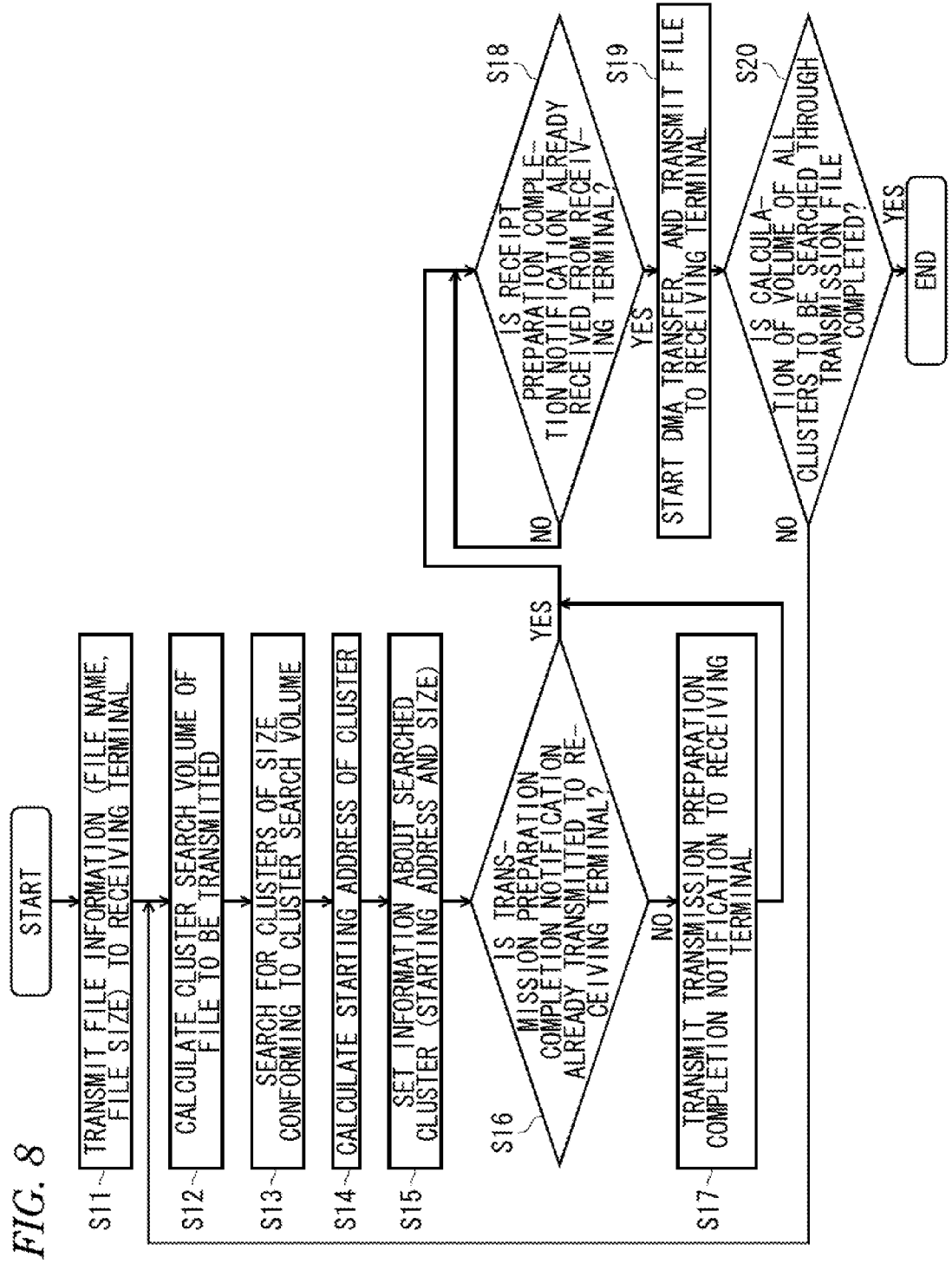
FIG. 8 is a flowchart for explaining operation of the transmission terminal.

The operation of the transmission terminal 10 is now described by reference to FIG. 8. FIG. 8 is a flowchart for explaining operation of the transmission terminal 10.

In FIG. 8, in response to user's operation for operating the transmission terminal, the file control section 20 outputs to the inter-terminal communication control section 19 a command to transmit to the receiving terminal 30 file information including a file name and a file size of a file to be transmitted. In response to the command from the file control section 20, the inter-terminal communication control section 19 outputs to the communication section 12 the file information including the file name and the file size of the file to be transmitted. In accordance with an output from the inter-terminal communication control section 19, the communication section 12 transmits to the receiving terminal 30 the file information including the file name and the file size of the file to be transmitted (S11).

The file control section 20 outputs to the cluster search control section 17 file information about the file to be transmitted. In addition, the file control section 20 outputs to the cluster search control section 17 a command to calculate from the file information a first search volume to be performed before DMA transfer. In response to the command from the file control section 20, the cluster search control section 17 outputs to the cluster search volume calculation section 15 a command to calculate the first search volume to be performed before DMA transfer.

In response to the command from the cluster search control section 17, the cluster search volume calculation section 15 calculates a cluster search volume (the first search volume) to be performed before DMA transfer and transmission of the file to the receiving terminal 30 (S12). The cluster search volume calculation section 15 outputs a calculation result of the first search volume to the cluster search control section 17. The cluster search control section 17 outputs the calculation result of the first search volume to the cluster search section 16, additionally outputting to the cluster search section 16 a command to search the file system of the file management section 14 for clusters that is equal in number to the calculation result of the first search volume.

In response to the command from the cluster search control section 17, the cluster search section 16 searches the file system of the file management section 14 for clusters corresponding to the calculation result of the first search volume (S13). In addition, the cluster search section 16 calculates respective starting addresses of the searched clusters (S14) to thus generate cluster information, outputting the thus-generated cluster information to the cluster search control section 17.

The cluster search control section 17 outputs the cluster information to the file control section 20. The file control section 20 sets the cluster information on the DMA control section 18 (S15). Moreover, the cluster search control section 17 outputs to the DMA transfer section 13 a command to DMA-transfer data pertinent to files, which are stored in the starting address of the cluster information, by an amount corresponding to the unit duster size of the cluster information.

When a notification to the effect that a preparation for transmitting the data pertinent to a file to be transmitted is completed (i.e., a transmission preparation completion notification) is not yet transmitted to the receiving terminal 30 (NO in S16), the file control section 20 outputs to the inter-terminal communication control section 19 a command to transmit the transmission preparation completion notification. In response to the command from the file control section 20, the inter-terminal communication control section 19 outputs to the communication section 12 the command to transmit the transmission preparation completion notification to the receiving terminal 30. In response to the command from the inter-terminal communication control section 19, the communication section 12 transmits the transmission preparation completion notification to the receiving terminal 30 (S17).

On the other hand, when the transmission preparation completion notification has already been transmitted to the receiving terminal 30 (YES in S16), operation of the transmission terminal 10 proceeds to step S18. In the transmission terminal 10, the inter-terminal communication control section 19 determines whether or not the notification that the preparation for receiving a file is completed (a receipt preparation completion notification) has been received from the receiving terminal 30 (S18).

When the notification that the preparation for receiving a file is completed (a receipt preparation completion notification) is already received from the receiving terminal 30 (YES in S18), the operation of the transmission terminal 10 proceeds to step S19. The DMA transfer section 13 DMA-transfers the data from the storage section 11 to the communication section 12 by use of the cluster information set in step S15 (S19). Specifically, the DMA transfer section 13 DMA-transfers data pertinent to a file stored at the starting address of the cluster information from the storage section 11 to the communication section 12 by an amount corresponding to the unit cluster size of the cluster information. In addition, since the receipt preparation completion notification is received from the receiving terminal 30, the communication section 12 transmits to the receiving terminal 30 the data pertinent to the file DMA-transferred from the storage section 11 (S19).

In step S11, the file control section 20 determines whether or not the cluster information searched in step S15 is set in the DMA transfer section 13 with regard to the entire file size of the transmitted file information (S20).

When the cluster information searched in step S15 is already set in the DMA transfer section 13 with regard to the entire file size of the file information transmitted in step S11 (YES in S20), the operation of the transmission terminal 10 ends. In short, the DMA transfer and the transmission to the receiving terminal 30 in connection with the entire file size of the file information transmitted in step S11 are completed in step S19.

In the mean time, when the searched cluster information is not set in the DMA transfer section 13 (NO in S20), the operation of the transmission terminal 10 returns to step S12. Namely, the operation of the transmission terminal 10 is iterated until YES is selected in step S20 by means of performing calculation likewise while replacing the first search volume described in connection with step S12 with, in turn, the second search volume, ..., the $n^{th}$ search volume, to thus perform processing pertinent to steps subsequent to step S13.

<Explanations about the Operation of the Receiving Terminal 30>

Figure 9:
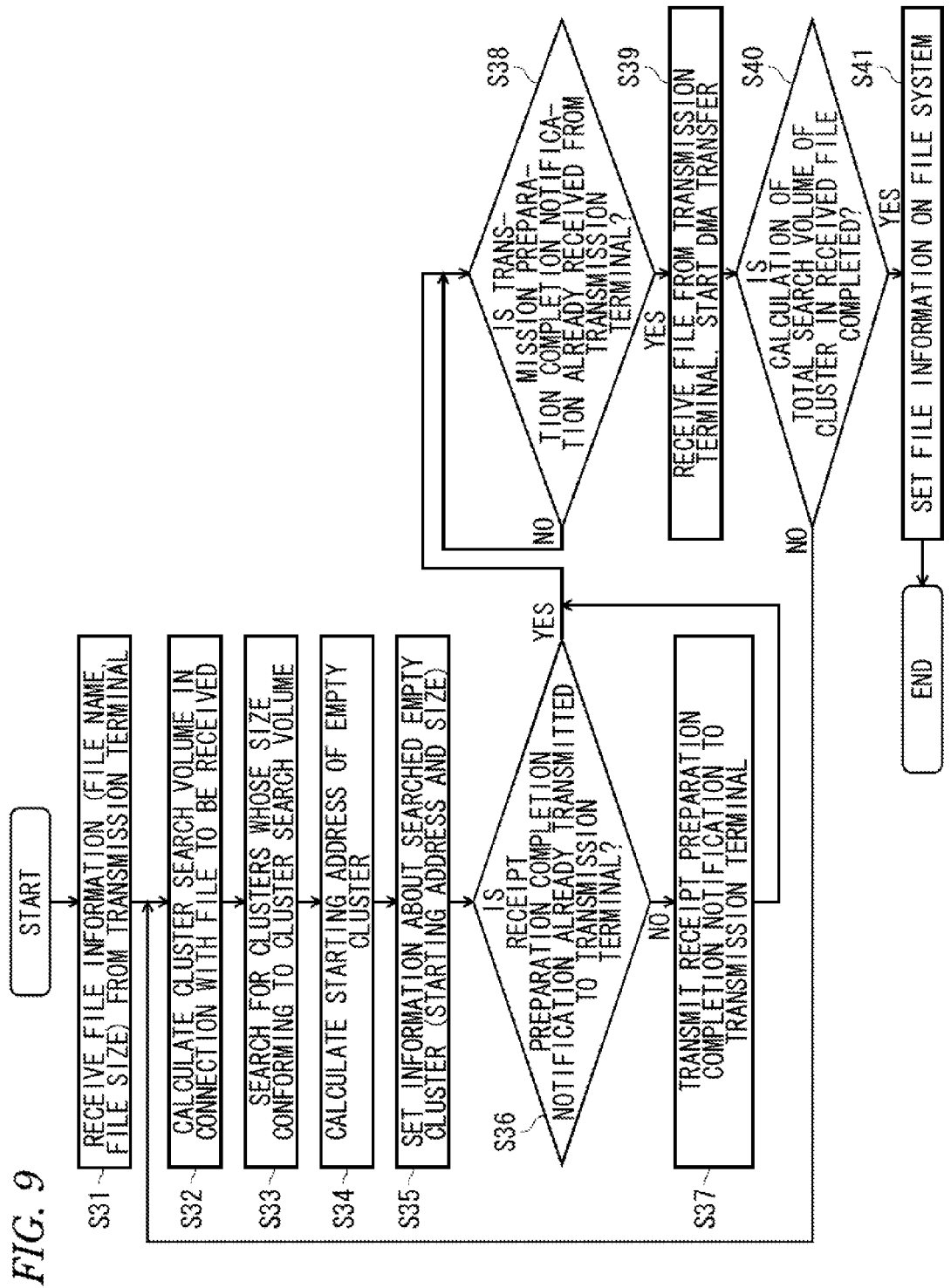
FIG. 9 is a flowchart for explaining operation of the receiving terminal.
Figure 10:
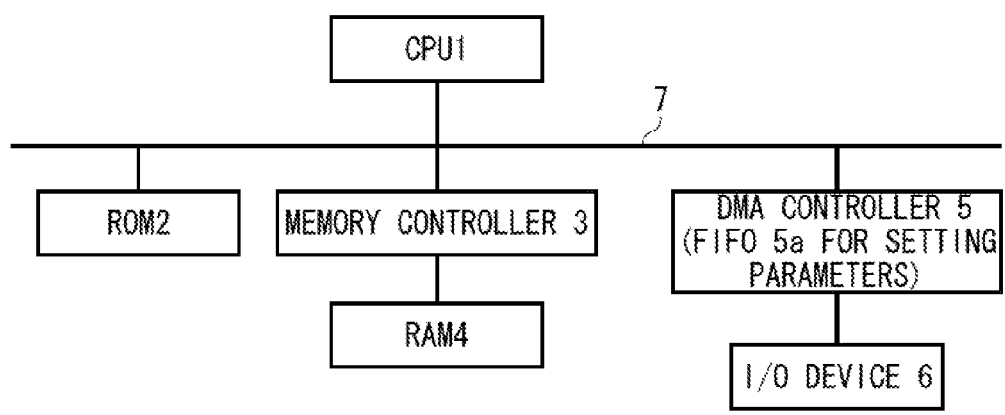
FIG. 10 is a block diagram showing a system configuration of a related-art DMA controller.

The operation of the receiving terminal 30 is now described by reference to FIG. 9. FIG. 9 is a flowchart for explaining the operation of the receiving terminal 30.

In FIG. 9, in response to user's operation for operating the receiving terminal, the file control section 40 outputs to the inter-terminal communication control section 39 a command to receive from the transmission terminal 10 file information including a file name and a file size of a file to be received. In response to the command from the file control section 40, the inter-terminal communication control section 39 outputs to the communication section 32 the file information including the file name and the file size of the file to be transmitted. In accordance with an output from the inter-terminal communication control section 19, the communication section 32 receives from the transmission terminal 10 the file information including the file name and the file size of the file to be transmitted (S31).

The file control section 40 outputs to the empty cluster search control section 37 file information about the file to be received. In addition, the file control section 40 outputs to the empty cluster search control section 37 a command to calculate from the file information a first search volume that is to be performed before receipt of a file from the transmission terminal 10 and DMA transfer. In response to the command from the file control section 40, the cluster search control section 37 outputs to the cluster search volume calculation section 35 a command to calculate the first search volume that is to be performed before DMA transfer.

In response to the command from the empty cluster search control section 37, the duster search volume calculation section 35 calculates a cluster search volume (the first search volume) that is to be performed before DMA transfer (S32). The cluster search volume calculation section 35 outputs a calculation result of the first search volume to the empty cluster search control section 37. The empty cluster search control section 37 outputs the calculation result of the first search volume to the empty cluster search section 36. The empty cluster search control section 37 outputs to the empty cluster search section 36 a command to search the file system of the file management section 34 for empty clusters that are equal in number to the clusters corresponding to the calculation result of the first search volume.

In response to the command from the empty cluster search control section 37, the empty cluster search section 36 searches the file system of the file management section 34 for empty clusters that are equal in number to clusters corresponding to the calculation result of the first search volume (S33). In addition, the empty cluster search section 36 calculates respective starting addresses of the searched clusters (S34) to thus generate cluster information, outputting the thus-generated cluster information to the cluster search control section 37.

The cluster search control section 37 outputs the empty cluster information to the file control section 40. The file control section 40 sets the empty cluster information on the DMA control section 38 (S35). Moreover, the file control section 40 outputs to the DMA transfer section 33 a command to DMA-transfer data pertinent to files stored at the starting address of the empty cluster information by an amount corresponding to the unit cluster size of the empty cluster information.

When a notification to the effect that a preparation for receiving the data pertinent to a file to be received is completed (i.e., a transmission preparation completion notification) is not yet transmitted to the transmission terminal 10 (NO in S36), the operation of the receiving terminal 30 proceeds to step S37. The file control section 40 outputs to the inter-terminal communication control section 39 a command to transmit the receipt preparation completion notification to the transmission terminal 10. In response to the command from the file control section 40, the inter-terminal communication control section 39 outputs to the communication section 32 the command to transmit the transmission preparation completion notification to the transmission terminal 10. In response to the command from the inter-terminal communication control section 39, the communication section 32 transmits the receipt preparation completion notification to the transmission terminal 10 (S37).

When the receipt preparation completion notification is already transmitted to the transmission terminal 10 (YES in S36), operation of the receiving terminal 30 proceeds to step S38. In the receiving terminal 30, the inter-terminal communication control section 39 determines whether or not the notification that the preparation for receiving a file from the transmission terminal 10 is completed (a transmission preparation completion notification) is already received from the transmission terminal 10 (S38).

When the notification that the preparation for transmitting a file is completed (a transmission preparation completion notification) is already received from the transmission terminal 10 (YES in S38), the operation of the receiving terminal 30 proceeds to step S39. The communication section 32 has already received the transmission preparation completion notification from the transmission terminal 10, receiving data pertinent to a file transmitted from the transmission terminal 10 (S39). In addition, the DMA transfer section 33 DMA-transfers from the communication section 32 to the storage section 31 data pertinent to the file stored at the starting address of the empty cluster information from the communication section 32 to the storage section 31 by an amount corresponding to the unit cluster size of the empty cluster information (S39).

In step S31, the file control section 40 determines whether or not the cluster information searched in step S35 is set in the DMA transfer section 33 with regard to the entire file size of the received file information (S40).

When the empty cluster information searched in step S35 is set in the DMA transfer section 33 with regard to the entire the size of the file information received in step S31 (YES in S40), the operation of the receiving terminal 30 ends. In short, in relation to the operation of the receiving terminal 30, a receipt from the transmission terminal 10 and DMA transfer with regard to the entire file size of the file information transmitted in step S31 are completed in step S39. Therefore, the file control section 40 sets the file information on the file system (S41), whereupon the operation of the receiving terminal 30 ends.

In the mean time, when the searched empty cluster information is not set in the DMA transfer section 33 (NO in S40), the operation of the receiving terminal 40 returns to step S32. Namely, the operation of the receiving terminal 30 is iterated until YES is selected in step S40 by means of performing calculation likewise while replacing the first search volume described in connection with step S32 with, in turn, the second search volume, . . . , the $n^{th}$ search volume, to thus perform processing pertinent to steps subsequent to step S33.

As above, the transmission terminal 10 calculates a first search volume that satisfies Mathematical Expression (1) before performing DMA transfer and transmitting the file to the receiving terminal 30. In addition, the transmission terminal 10 calculates the second search volume, . . . , the $n^{th}$ search volume that satisfy Mathematical Expression (2) while concurrently performing DMA transfer and transmitting the file to the receiving terminal 30, and performs in parallel a cluster search, DMA transfer, and transmission of the file to the receiving terminal 30.

The transmission terminal 10 of the embodiment minimizes setting data (cluster information) required for the DMA controller (the DMA transfer section 13) before initiation of the communication and can thereby diminish communication overhead. The transmission terminal 10 of the embodiment can reduce an amount of usage of memory required to store the setting data.

Before receiving the file from the transmission terminal 10 and performing DMA transfer, the receiving terminal 30 calculates the first search volume that satisfies Mathematical Expression (1). In addition, the receiving terminal 30 calculates the second search volume, . . . , the $n^{th}$ search volume that satisfy Mathematical Expression (2) concurrent with receipt of the file from the transmission terminal 10 and DMA transfer, and performs in parallel an empty cluster search, receipt of the file from the transmission terminal 10, and DMA transfer.

The receiving terminal 30 of the embodiment minimizes setting data (empty cluster information) required for the DMA controller (the DMA transfer section 33) and can thereby diminish the communication overhead. Further, the receiving terminal 30 of the embodiment can reduce the amount of usage of memory required to store the setting data.

A communication terminal according to an embodiment of the invention comprises: a storage section configured to store a file to be transmitted to an opponent terminal; a communication section configured to transmit the file to the opponent terminal; a cluster information calculation section configured to determine cluster information about a cluster for each set of data to be transferred; and a DMA transfer section configured to DMA-transfer the file from the storage section to the communication section on the basis of the cluster information about the cluster to be transferred that the cluster information calculation section determined, wherein the cluster information calculation section is adapted to request cluster information about a next cluster to be transferred during the course of DMA transfer.

A communication terminal according to an embodiment of the invention comprises: a communication section configured to receive a file transmitted from an opponent terminal; a storage section configured to store the file received by the communication section; an empty cluster information calculation section configured to calculate empty cluster information about empty clusters for each set of data to be transferred; and a DMA control section configured to set the empty cluster information about the file to be DMA-transferred, on the basis of the empty cluster information determined by the empty cluster information calculation section, wherein the empty cluster information calculation section is configured to determine empty cluster information about a next cluster to be transferred during course of DMA transfer.

As above, in the invention of the present patent application, the cluster search and the DMA transfer are performed in parallel at any communication speed, whereby high speed transfer involving a smaller amount of overhead can be implemented.

In the communication terminal according to an embodiment of the invention, the cluster information calculation section includes a cluster search volume calculation section configured to calculate a volume of cluster search; a cluster search section configured to search the storage section for clusters in accordance with a calculation result of the cluster search volume calculation section; a file management section configured to manage the storage section by use of a predetermined file system; and a DMA control section configured to set in the DMA transfer section cluster information about the clusters that make up the file to be DMA-transferred, on the basis of in accordance with a calculation result of the cluster search section and the file system.

In the invention of the present patent application, the cluster information calculation section thereby searches the storage section for clusters in accordance with a calculation result of the cluster search volume and also sets cluster information corresponding to the search result in the DMA transfer section, so that the cluster search and the DMA transfer can be performed in parallel.

In the communication terminal according to an embodiment of the invention, the empty cluster information calculation section includes a DMA transfer section configured to DMA-transfer the file from the communication section to the storage section on the basis of the empty cluster information about the empty clusters that are equal in number to clusters which make up the file; a file management section configured to manage the storage section by use of a predetermined file system; a cluster search volume calculation section configured to calculate the volume of cluster search; and an empty cluster search section configured to search the storage section for the empty clusters which are equal in number to the clusters, in accordance with a calculation result of the cluster search volume calculation section.

In the invention of the present patent application, the empty cluster information calculation section thereby searches the storage section for empty clusters in accordance with a calculation result of the cluster search volume and also sets empty cluster information corresponding to the search result in the DMA transfer section, so that the empty cluster search and the DMA transfer can be performed in parallel.

A communication terminal according to an embodiment of the invention comprises: a storage section configured to store a file to be transmitted to an opponent terminal; a communication section configured to transmit the file to the opponent terminal; a DMA transfer section configured to DMA-transfer the file from the storage section to the communication section on the basis of cluster information about clusters which make up the file; a file management section configured to manage the storage section by use of a predetermined file system; a cluster search volume calculation section configured to calculate the volume of cluster search; a cluster search section configured to search the storage section for the clusters in accordance with a calculation result of the cluster search volume calculation section; and a DMA control section configured to set in the DMA transfer section cluster information about the clusters that make up the file to be DMA-transferred, on the basis of in accordance with a calculation result of the cluster search section and the file system.

A communication terminal according to an embodiment of the invention comprises: a communication section configured to receive a file transmitted from an opponent terminal; a storage section configured to store the file transmitted from the opponent terminal; a DMA transfer section configured to DMA-transfer the file from the communication section to the storage section on the basis of empty cluster information about empty clusters equal in number to clusters which make up the file; a file management section configured to manage the storage section by use of a predetermined file system; a cluster search volume calculation section configured to calculate the volume of cluster search; an empty cluster search section configured to search the storage section for the empty dusters equal in number to the clusters, in accordance with a calculation result of the cluster search volume calculation section; and a DMA control section configured to set empty cluster information about the file to be DMA-transferred, on the basis of a search result of the empty duster search section and the file system.

In the invention of the present patent application, the cluster search and the DMA transfer are thereby performed in parallel at any communication speed, whereby high speed transfer involving a smaller amount of overhead can be implemented.

In the communication terminal according to an embodiment of the invention, the file system is any one of FAT 16, FAT 32, and FAT 64.

In the invention of the present patent application, the file system can be simply configured.

The communication terminal according to an embodiment of the invention further comprises an inter-terminal communication control section configured to transmit to the opponent terminal file information including a file size of a file to be transmitted, wherein the file management section is configured to acquire from the file system a size of clusters which make up a file; and the cluster search volume calculation section is configured to calculate a volume of cluster to be searched which makes up the file to be DMA-transferred, on the basis of the cluster size until an end cluster making up the file to be transmitted.

In the invention of the present patent application, the cluster search volume calculation section can thereby calculate a volume of cluster that makes up a file to be transmitted to an opponent terminal, in an iterative manner, until the final cluster that makes up the file to be transmitted to the opponent terminal.

The communication terminal according to an embodiment of the invention further comprises: an inter-terminal communication control section configured to receive from the opponent terminal file information including a file size of the file to be received, wherein the file management section is configured to acquire from the file system a size of clusters which make up the file, and the duster search volume calculation section is configured to calculate a volume of duster to be searched which makes up the file to be DMA-transferred, from the cluster size until an end cluster needed to store the file to be received.

In the invention of the present patent application, the cluster search volume calculation section can thereby calculate a volume of cluster that makes up a file to be received from the opponent terminal, in an iterative manner, until the final cluster that makes up the file to be received from the opponent terminal.

In the communication terminal according to an embodiment of the invention, the cluster search volume calculation section is configured to calculate, before the DMA transfer, the cluster search volume from a file size of the file to be transmitted, a time to require a search for unit-cluster-size cluster, and a time required for the communication section to transmit the unit-cluster-size file.

In the communication terminal according to an embodiment of the invention, the cluster search volume calculation section is configured to calculate, before the DMA transfer, the cluster search volume from a file size of the file to be received, a time to require a search for unit-cluster-size empty cluster, and a time required for the communication section to receive the unit-cluster-size files.

In the invention of the present patent application, the cluster search volume calculation section calculates a cluster search volume before the DMA transfer. Hence, the DMA transfer section can consecutively perform DMA transfer in parallel with the cluster search in accordance with the set cluster information, so that occurrence of a wait of given time for DMA transfer can be prevented.

In the communication terminal according to an embodiment of the invention, the cluster search volume calculation section is configured to calculate a volume of cluster to be searched which makes up a file to be DMA-transferred subsequent to current DMA transfer in accordance with the size of the file being DMA-transferred while the DMA transfer section is in the course of performance of the DMA transfer.

In the communication terminal according to an embodiment of the invention, the cluster search volume calculation section is configured to calculate a volume of cluster to be searched which makes up a file to be DMA-transferred subsequent to current DMA transfer, in accordance with the size of the file being DMA-transferred while the DMA transfer section is in the course of performance of the DMA transfer.

In the invention of the present patent application, the cluster search volume calculation section calculates a cluster search volume in the course of performance of the DMA transfer. Hence, the DMA transfer section can consecutively perform DMA transfer in parallel with the cluster search in accordance with the set cluster information, so that occurrence of a wait of given time for DMA transfer can be prevented.

In the communication terminal according to an embodiment of the invention, the communication section is configured to transmit a cluster search completion notification conforming to the cluster search volume calculated before performance of the DMA transfer and to receive from the opponent terminal an empty cluster search completion notification conforming to the cluster search volume calculated before performance of the DMA transfer; and the DMA transfer section is configured to start DMA-transferring the file to be transmitted after the communication section transmits the cluster search completion notification and receives the empty cluster search completion notification.

In the invention of the present patent application, the communication terminal thereby initiates DMA transfer at the time of completion of a search for clusters that make up the file to be transmitted by the communication terminal and a search for empty clusters that are equal in number to the clusters which make up a file to be received by the opponent terminal. Therefore, the communication terminal can perform as a series of processing operations transmission and receipt of a file to and from the opponent terminal and storage of the file in the opponent terminal without involvement of a delay.

In the communication terminal according to an embodiment of the invention, the communication section is configured to transmit an empty cluster search completion notification conforming to the cluster search volume calculated before performance of the DMA transfer and to receive from the opponent terminal a cluster search completion notification conforming to the cluster search volume calculated before performance of the DMA transfer; and the DMA transfer section is configured to start DMA-transferring the received file after the communication section transmits the empty cluster search completion notification and receives the cluster search completion notification.

In the invention of the present patent application, the communication terminal thereby initiates DMA transfer at the time of completion of a search for empty clusters that are equal in number to clusters that make up a file to be received by the communication terminal and a search for clusters that make up a file to be transmitted from the opponent terminal. Therefore, the communication terminal can perform as a series of processing operations transmission and receipt of the file to and from the opponent terminal without involvement of a delay.

While the present invention has been described in detail, or with reference to the specific embodiments, it is apparent for those skilled in the art that the invention may be modified and changed in various manners without departing from the scope and spirit of the invention.

This invention is based on Japanese Patent Application (Japanese Patent Application No. 2011-114900) filed on May 23, 2011, the content of which is incorporated herein by reference.

INDUSTRIAL APPLICABILITY

A communication terminal of the invention is useful as a transmission terminal or a receiving terminal that enables a reduction in communication overhead by minimizing a time to prepare for setting data required for a DMA controller before initiation of a communication.

DESCRIPTIONS OF THE REFERENCE NUMERALS AND SYMBOLS

10 TRANSMISSION TERMINAL
11, 31 STORAGE SECTION
12, 32 COMMUNICATION SECTION
13, 33 DMA TRANSFER SECTION
14, 34 FILE MANAGEMENT SECTION
15 CLUSTER SEARCH VOLUME CALCULATION SECTION
16 CLUSTER SEARCH SECTION
17 CLUSTER SEARCH CONTROL SECTION
18, 38 DMA CONTROL SECTION
19, 39 INTER-TERMINAL COMMUNICATION CONTROL SECTION
20, 40 FILE CONTROL SECTION
35 CLUSTER SEARCH VOLUME CALCULATION SECTION
36 EMPTY CLUSTER SEARCH SECTION
37 EMPTY CLUSTER SEARCH CONTROL SECTION

The invention claimed is:
1. A communication terminal comprising:
a storage section configured to store a file to be transmitted to an opponent terminal;
a communication section configured to transmit the file to the opponent terminal;
a cluster information calculation section configured to determine cluster information about a cluster for each set of data to be transferred; and
a DMA transfer section configured to DMA-transfer the file from the storage section to the communication section on the basis of the cluster information about the cluster to be transferred that the cluster information calculation section determined, wherein the cluster information calculation section is adapted to request cluster information about a next cluster to be transferred during the course of DMA transfer, and wherein the cluster information calculation section includes a cluster search volume calculation section configured to calculate a volume of cluster search;

a cluster search section configured to search the storage section for clusters in accordance with a calculation result of the cluster search volume calculation section;

a file management section configured to manage the storage section by use of a predetermined file system; and a DMA control section configured to set in the DMA transfer section cluster information about the clusters that make up the file to be DMA-transferred, on the basis of in accordance with a calculation result of the cluster search section and the file system.

2. A communication terminal comprising:

a storage section configured to store a file to be transmitted to an opponent terminal;

a communication section configured to transmit the file to the opponent terminal;

a DMA transfer section configured to DMA-transfer the file from the storage section to the communication section on the basis of cluster information about clusters which make up the file;

a file management section configured to manage the storage section by use of a predetermined file system;

a cluster search volume calculation section configured to calculate the volume of cluster search;

a cluster search section configured to search the storage section for the clusters in accordance with a calculation result of the cluster search volume calculation section; and a DMA control section configured to set in the DMA transfer section cluster information about the clusters that make up the file to be DMA-transferred, on the basis of in accordance with a calculation result of the cluster search section and the file system.

3. The communication terminal according to claim 2, wherein the file system is any one of FAT 16, FAT 32, and FAT 64.

4. The communication terminal according to claim 2, further comprising an inter-terminal communication control section configured to transmit to the opponent terminal file information including a file size of a file to be transmitted, wherein the file management section is configured to acquire from the file system a size of clusters which make up a file; and the cluster search volume calculation section is configured to calculate a volume of cluster to be searched which makes up the file to be DMA-transferred, on the basis of the cluster size until an end cluster making up the file to be transmitted.

5. The communication terminal according to claim 4, wherein the cluster search volume calculation section is configured to calculate, before the DMA transfer, the cluster search volume from a file size of the file to be transmitted, a time to require a search for unit-cluster-size cluster, and a time required for the communication section to transmit the unit-cluster-size file.

6. The communication terminal according to claim 5, wherein the cluster search volume calculation section is configured to calculate a volume of cluster to be searched which makes up a file to be DMA-transferred subsequent to current DMA transfer in accordance with the size of the file being DMA-transferred while the DMA transfer section is in the course of performance of the DMA transfer.

7. The communication terminal according to claim 5, wherein the communication section is configured to transmit a cluster search completion notification conforming to the cluster search volume calculated before performance of the DMA transfer and to receive from the opponent terminal an empty cluster search completion notification conforming to the cluster search volume calculated before performance of the DMA transfer; and the DMA transfer section is configured to start DMA-transferring the file to be transmitted after the communication section transmits the cluster search completion notification and receives the empty cluster search completion notification.

* * * * *